United States Patent [19]

Zyngier

[11] Patent Number: 4,489,979
[45] Date of Patent: Dec. 25, 1984

[54] ADJUSTABLE HEADREST

[75] Inventor: John F. Zyngier, Warren, Mich.

[73] Assignee: General Motors Corporation, Detroit, Mich.

[21] Appl. No.: 403,798

[22] Filed: Jul. 30, 1982

[51] Int. Cl.³ .............................................. A47C 7/36
[52] U.S. Cl. .................................... 297/391; 297/410
[58] Field of Search ............................... 297/410, 391

[56] References Cited

U.S. PATENT DOCUMENTS

| | | | |
|---|---|---|---|
| 3,511,535 | 5/1970 | Gunlock | 297/410 |
| 3,512,832 | 5/1970 | Kage | 297/410 |
| 3,544,162 | 12/1970 | Uchiyamada | 297/410 |
| 3,563,603 | 2/1971 | D'Aprile | 297/410 |
| 3,567,282 | 3/1971 | Ohta et al. | 297/410 |
| 3,574,398 | 4/1971 | Hairgrove | 297/410 |
| 3,608,965 | 9/1971 | Cziptschirsch | 297/410 |
| 3,635,527 | 1/1972 | Weber | 297/410 |
| 3,904,241 | 9/1975 | Makinen | 297/410 X |
| 4,111,483 | 9/1978 | Jaeger | 297/410 |
| 4,411,470 | 10/1983 | Nishimura et al. | 297/410 |

Primary Examiner—Francis K. Zugel
Attorney, Agent, or Firm—Charles E. Leahy

[57] ABSTRACT

The headrest is adjustably mounted by a molded plastic guide inserted through an aperture of the mounting bracket concealed in the seat back and having a tubular body with a central bore therethrough for receiving the support post of the headrest. Flexure fingers are molded integrally with the tubular body and have a free state radially contracted position partly obstructing the central bore. One or more locking abutments are provided on the outside of the flexure fingers and are radially contracted therewith to facilitate insertion of the tubular guide through the mounting bracket aperture. Upon insertion of the headrest post the flexure fingers are forced radially outward to lock the locking abutments with the mounting bracket. The forced radial outward flexure of the flexure fingers induces a radial inward bias by which the flexure fingers frictionally engage and maintain the support post at a selected vertically adjusted position relative the seat back. The support post has a necked down central portion defining a stop face. A flange molded integrally with the plastic guide overlies the top of the seat back and defines a recess opening which cages a retainer spring seating within the necked down central portion for engagement by the stop face to limit the adjusting movement of the headrest.

3 Claims, 6 Drawing Figures

ADJUSTABLE HEADREST

The invention relates to an adjustable headrest for a vehicle seat back and more particularly provides a molded plastic guide which mounts the headrest support bar within the seat back and frictionally impedes the vertical adjusting movement of the headrest.

BACKGROUND OF THE INVENTION

It is well known in motor vehicle seats to provide a headrest at the top of the seat back for occupant safety and comfort. It is also known to mount the headrest via one or more support posts which extend downwardly into the top of the seat back and are mounted therein by mechanism enabling vertical adjustment of the headrest to a selected height.

SUMMARY OF THE INVENTION

The invention provides a new and improved headrest including a molded plastic guide which is adapted for insertion through an aperture of the mounting bracket concealed in the seat back. The molded plastic guide has a tubular body with a central bore therethrough adapted to receive the support post of the headrest. One or more flexure fingers are molded integrally with the tubular body and have a free state radially contracted position in which the flexure fingers project within and partly obstruct the central bore. One or more locking abutments are provided on the outside of the flexure fingers and are conconmitantly radially contracted to facilitate insertion of the tubular guide through the mounting bracket aperture. A support post connected to the headrest is inserted through the central bore of the tubular guide and engages with the flexure fingers to effect forced radial outward flexure of the fingers to move the locking abutments into engagement with the mounting bracket to thereby lock the tubular guide to the mounting bracket. The forced radial outward flexure of the flexure fingers from the free state radial contracted position induces a radial inward bias of the flexure fingers to frictionally engage the support post and thereby maintain the support post at a selected vertically adjusted position relative the seat back. The support post has a necked down central portion defining an upwardly facing stop face. A flange molded integrally with the plastic guide overlies the top of the seat back and defines a recess opening which cages a retainer spring seating within the necked down central portion of the support post for engagement by the upward facing stop face to limit the upward adjusting movement of the headrest.

The object, feature and advantage of the invention resides in the provision of a tubular plastic guide for insertion through the apertured mounting bracket of a seat back and having an integral flexure finger with a free state radially contracted position partially obstructing the central bore so that the headrest support post inserted through the central bore effects forced radial outward flexure of the flexure finger and induces an opposing radial inward bias of the flexure finger to frictionally engage the support post and thereby maintain a selected vertically adjusting position.

A further object, feature and advantage of the invention resides in the provision of a flexure finger molded integrally with a tubular body adapted for insertion through an aperture mounted bracket of a seat back having a free state radially contracted position in which a locking abutment carried by the flexure finger is radially contracted to facilitate insertion of the tubular guide into the apertured mounting bracket and the subsequent insertion of a headrest support post through the central bore flexes the flexure finger radially outward to carry the locking abutment into engagement with the apertured mounting bracket and the inward radial bias of the flexure finger frictionally maintains a selected vertically adjusted position of the headrest.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
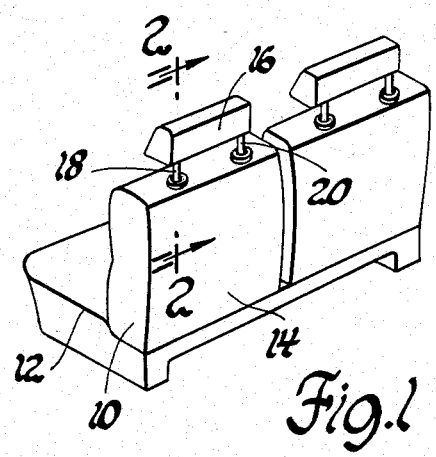
FIG. 1 is a perspective view of the vehicle seat having a headrest according to the invention.

Referring to FIG. 1, there is shown a vehicle seat 10 including a seat bottom 12 and a seat back 14. A padded headrest assembly 16 is mounted on the seat back 14 by support posts 18 and 20.

Figure 2:
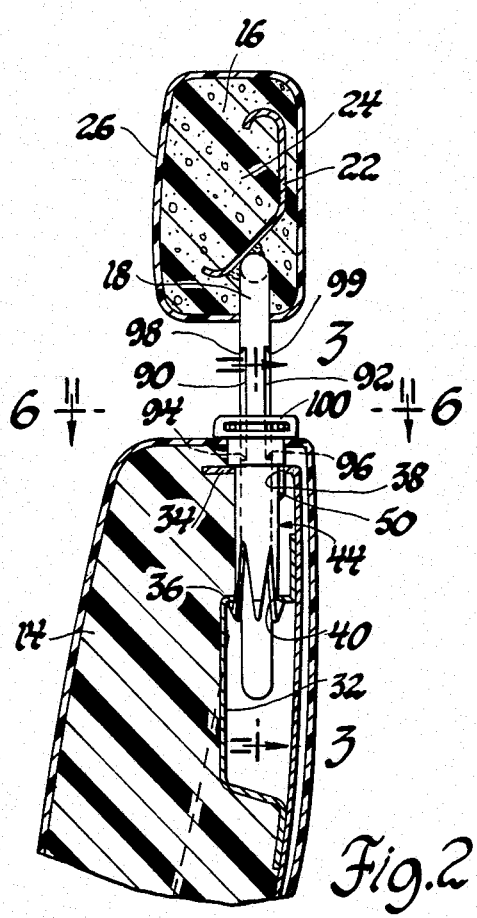
FIG. 2 is a sectional view taken in the direction of arrows 2—2 of FIG. 1.

Referring to FIG. 2, it is seen that the headrest assembly 16 includes a frame 22 which carries a foam cushion 24 enclosed within a cover 26. The support post 18 is welded or otherwise suitably attached to the frame 22 and extends downwardly within the seat back 14. The seat back 14 includes a mounting bracket 32 having an upper wall 34 and a lower wall 36 which are vertically spaced apart from one another as best seen in FIG. 2. Aligned mounting apertures 38 and 40 are provided respectively in the upper wall 34 and lower wall 36.

A molded plastic guide 44 is provided for insertion through the apertures 38 and 40 of the mounting bracket 32. The plastic guide 44 includes a tubular body 46 having a central bore 48 extending longitudinally therethrough. A longitudinally extending lug 50 projects from the outer wall of the tubular body 46 and mates with a slot of the mounting bracket upper wall 34 to fix the plastic guide 44 against rotation within the mounting bracket 32. As seen in FIGS. 2, 4 and 5, the tubular body 46 also has circumferentially spaced longitudinally extending V-shaped slots 54, 56, 58 and 60 which extend from the distal end of the tubular body 46 and communicate with the central bore 48 to define radially spaced flexure fingers 64, 66, 68 and 70. As best seen in FIG. 4, the plastic guide 44 is molded in a manner by which the flexure fingers have a free state radially contracted position so that flexure fingers project within and partially obstruct the bore 48. The distal end of each of the flexure fingers 64, 66, 68 and 70 has a locking abutment 74 which defines an upwardly facing locking shoulder 76. The radial contraction of the flexure fingers and the radial dimension of the locking abutments 74 integral therewith is such that the locking abutments are radially contracted relative the apertures 38 and 40 of the mounting bracket upper wall 34 and lower wall 36 to facilitate insertion of the tubular body 46 downwardly into the mounting bracket as shown in FIGS. 2, 3 and 4.

Figure 3:
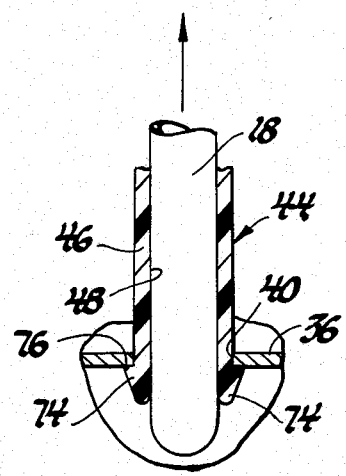
FIG. 3 is a sectional view taken in the direction of arrows 3—3 of FIG. 2.
Figure 4:
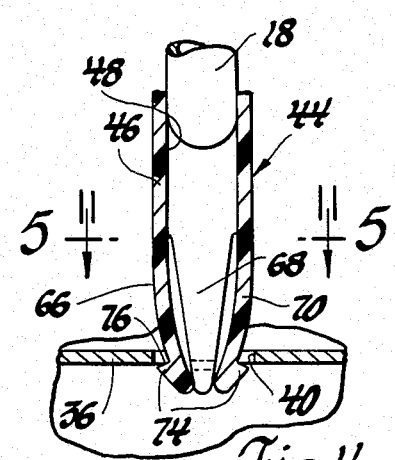
FIG. 4 is a view similar to FIG. 3 but showing the molded tubular guide prior to the insertion of the headrest post through the central bore thereof.
Figure 5:
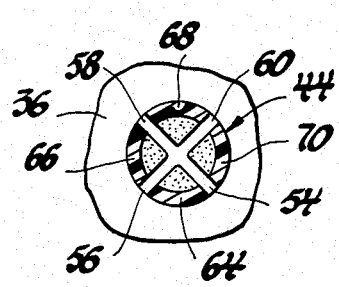
FIG. 5 is a sectional view taken in the direction of arrows 5—5 of FIG. 4.

As best seen by comparing FIG. 4 with FIG. 3, it will be appreciated that the insertion of the headrest support post 18 into the central bore 48 causes the support post to urge the flexure fingers 64, 66, 68 and 70 radially outward from their free state radially contracted position so that the locking abutments 74 are radially expanded into interference with the lower wall 36 of the mounting bracket 32. Accordingly, engagement of the locking shoulder 76 with the mounting bracket lower wall 36 will prevent the removal of the plastic guide 44 from the seat back. Furthermore, the forced radial outward flexure of the flexure fingers from the free state radial contracted position of FIG. 4 induces a counteracting radial inward bias of the flexure fingers 64, 66, 68 and 70 to frictionally engage with the support post 18 and thereby frictionally maintain the support post 18 and headrest 16 at a selected vertically adjusted position relative to the seat back.

Figure 6:
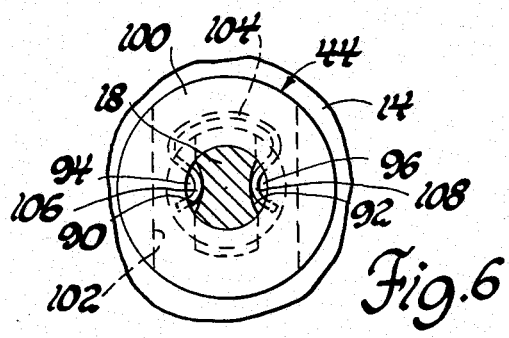
FIG. 6 is a sectional view taken in the direction of arrows 6—6 of FIG. 2.

Referring to FIGS. 2 and 6, it is seen that the cross-section of the support post 18 is necked down along a central portion of its length by the provision of arcuate opposed facing recesses 90 and 92 which define upward facing stop faces 94 and 96 and downward facing stop faces 98 and 99. Flange 100 is molded integrally at the top of the plastic guide 44 and has a recess slot opening 102 extending horizontally therethrough. A hairpin-shaped retainer spring 104, FIG. 6, is caged within the recessed slot opening 102 and has spaced apart legs 106 and 108 which are engaged within the arcuate recesses 90 and 92 of the support post 18 to provide snap retention of the retainer spring 104 within the slot 102. Upon upward movement of the headrest 16, the upward facing stop faces 94 and 96 of the post 18 will be carried into engagement with the legs 106 and 108 of the spring 104, thereby preventing the removal of the headrest 16 from the seat back 14 by limiting the upward adjusting movement. Downward adjusting movement of the headrest is limited by the engagement of downward facing stop faces 98 and 99 with the legs 106 and 108 of the retainer spring 104 or by engagement of the headrest 16 with the seat back 14. Accordingly, the vertical extent of the necked down portion defines the range of permissible vertical adjusting movement of the headrest.

If it is necessary to remove the headrest for maintenance and service, the retainer spring 104 may be removed from the slot 102 of the plastic guide 44 to enable unlimited upward movement of the support post 18. The removal of the support post 18 concomitantly permits the flexure fingers 64, 66, 68 and 70 to return to the free state radially contracted position of FIG. 4 so that the plastic guide 44 can be removed from the seat back.

While the invention has been described herein in terms of the preferred embodiment shown in the drawings, it is not intended to be limited thereto. For example, it is preferred to employ a plurality of flexure fingers as shown in the drawing, however, single flexure finger may be operative to frictionally impede adjusting movement of the headrest. Furthermore, a single locking abutment may be sufficient to retain the plastic guide within the apertured mounting bracket. Furthermore, although the flexure fingers are shown herein as being provided at the distal end of the plastic guide, it may be desirable to have the tubular body of the plastic guide extend for a substantially greater length and to have the flexure finger integrally molded along a central portion of the tubular body instead of at the distal end of the tubular body.

Thus, it is seen that the invention provides a new and improved retention and adjustment arrangement for vertically movable vehicle seat back headrest.

The embodiments of the invention in which an exclusive property or privilege is claimed are defined as follows:

1. An adjustable headrest for a vehicle seat back having an apertured mounting bracket comprising:
   a molded plastic guide having a tubular body adapted to extend through the aperture of the mounting bracket and having a central bore therethrough, at least one flexure finger molded integrally with the tubular body and having a free state radially contracted position in which the flexure finger projects within the central bore, and locking abutment means integral with the flexure finger and projecting therefrom; and
   a support post connected to the headrest and adapted to be inserted through the central bore of the tubular guide and into engagement with the flexure finger to effect forced radial outward flexure of the flexure finger to move the locking abutment means into engagement with the mounting bracket to prevent removal of the plastic guide from the mounting bracket, said forced radial outward flexure of the flexure finger from the free state radial contracted position causing a radial inward bias of the flexure finger to frictionally engage the support post and thereby maintain the support post and headrest at a vertically adjusted position relative the seat back.

2. An adjustable headrest for a vehicle seat back having an apertured mounting bracket comprising:
   a molded plastic guide having a tubular body adapted to extend through the aperture of the mounting bracket and having a central bore therethrough, a plurality of circumferentially spaced flexure fingers molded integrally with the tubular body at the distal end thereof and having free state radially contracted positions in which the flexure fingers project within the central bore, and a locking abutment means integral with each of the flexure fingers and projecting therefrom; and
   a support post connected to the headrest and adapted to be inserted through the central bore of the tubular guide and into engagement with the flexure fingers to effect forced radial outward flexure of the flexure fingers to move the locking abutment means into engagement with the mounting bracket to prevent removal of the plastic guide from the mounting bracket, said forced radial outward flexure of the flexure finger from the free state radial contracted positions causing a radial inward bias of the flexure fingers to frictionally engage the support post and thereby maintain the support post and headrest at a vertically adjusted postion relative the seat back.

3. An adjustable headrest for a vehicle seat back having an apertured mounting bracket comprising:
   a molded plastic guide adapted for insertion through the aperture of the mounting bracket and having a tubular body with a central bore therethrough, a flange adapted to overlie a seat back and having a recess opening therein communicating with the central bore, and at least one flexure finger molded integrally with the tubular body and having a free state radially contracted position in which the flexure finger projects within the central bore, and locking abutment means integral with the flexure finger and projecting therefrom;

a support post connected to the headrest and having a necked down central portion, said support post being adapted for insertion through the central bore of the tubular guide and into engagement with the flexure finger to effect forced radial outward flexure of the flexure finger to move the locking abutment means into engagement with the mounting bracket to prevent removal of the plastic guide from the mounting bracket, said forced radial outward flexure of the flexure finger from the free state radial contracted positions causing a radial inward bias of the flexure finger to frictionally engage the support post and maintain a selected vertically adjusted position; and a retainer spring removably caged within the recess opening of the flange and adapted to seat within the necked down central portion of the support post to limit vertical adjusting movement of the headrest to a permissable range defined by the extent of the necked down central portion to prevent removal of the headrest from the seat back.

* * * * *